J. KENNEDY.
SHAFT COUPLING.
APPLICATION FILED AUG. 2, 1913.
1,112,219.
Patented Sept. 29, 1914.
2 SHEETS—SHEET 2.
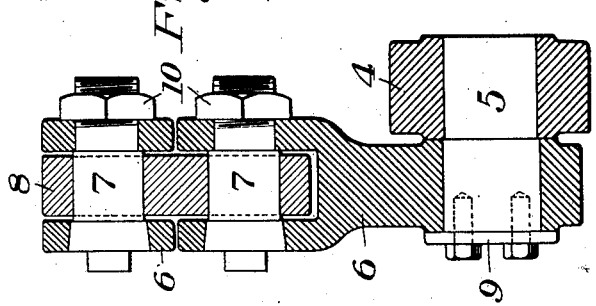
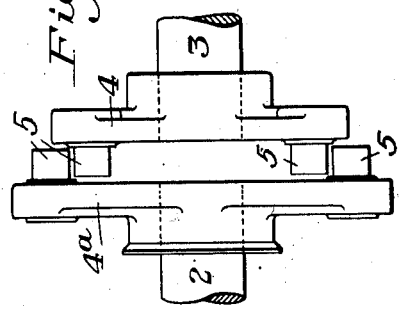
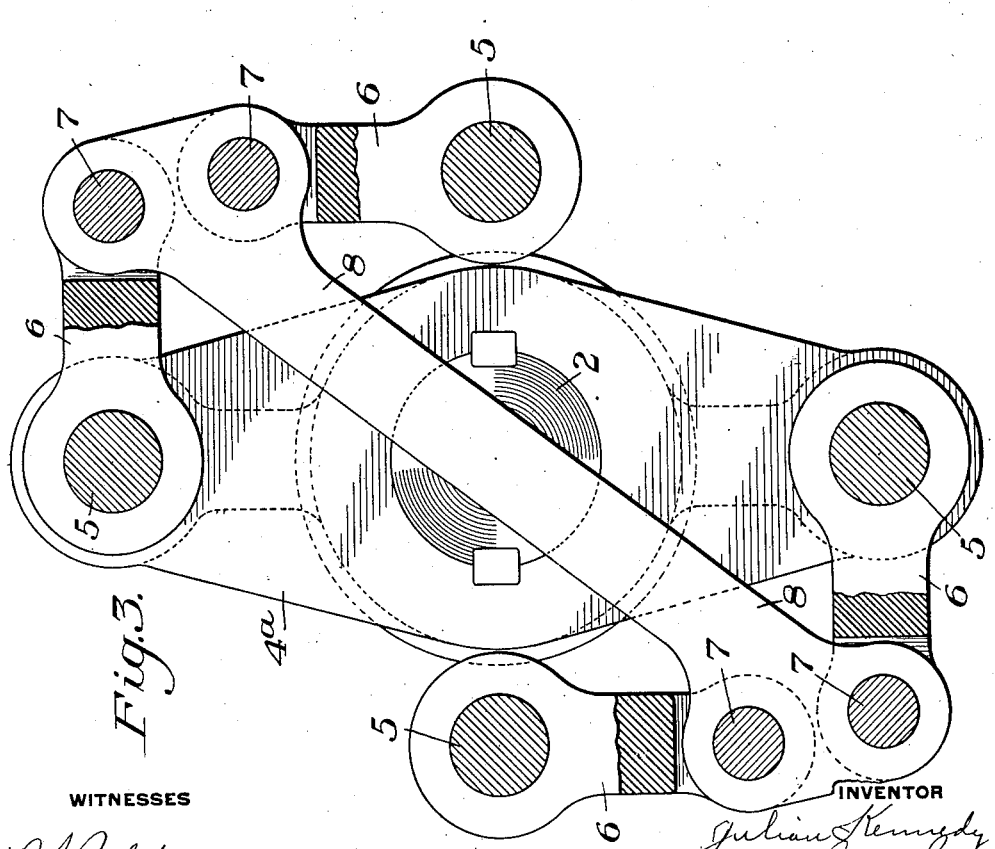

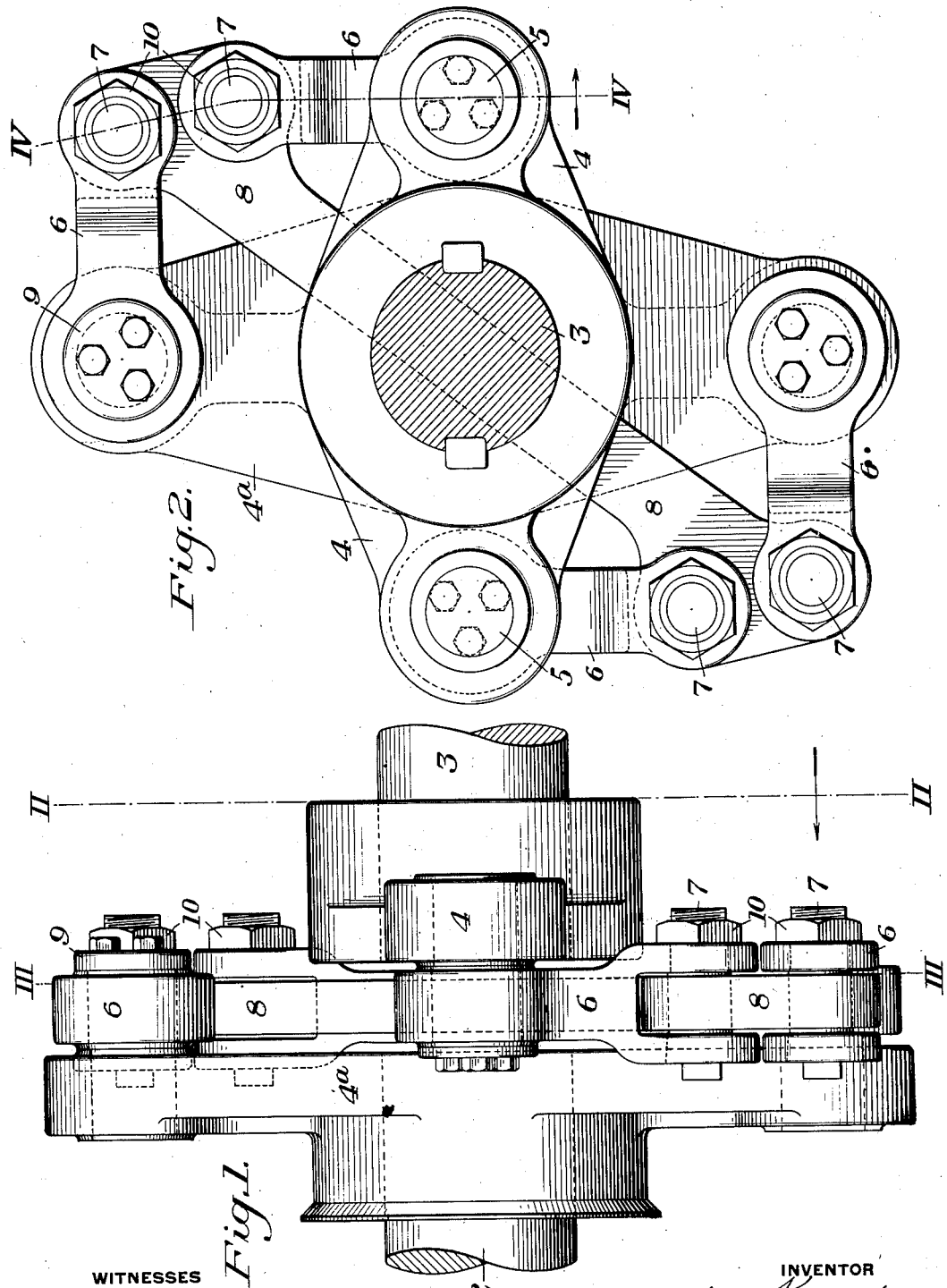

UNITED STATES PATENT OFFICE.

JULIAN KENNEDY, OF PITTSBURGH, PENNSYLVANIA.

SHAFT-COUPLING.

1,112,219.  Specification of Letters Patent.  Patented Sept. 29, 1914.

Application filed August 2, 1913. Serial No. 782,682.

*To all whom it may concern:*

Be it known that I, JULIAN KENNEDY, a citizen of the United States, residing at Pittsburgh, in the county of Allegheny and State of Pennsylvania, have invented a new and useful Improvement in Shaft-Couplings, of which the following is a full, clear, and exact description, reference being had to the accompanying drawings, forming part of this specification, in which—

Figure 1 is a side elevation of a shaft coupling embodying my invention; Fig. 2 is a section on the line II—II of Fig. 1; Fig. 3 is a section on the line III—III of Fig. 1; Fig. 4 is a detail view showing one set of the link connections, the sections being taken on the line IV—IV of Fig. 2; and Fig. 5 is a plan view on a smaller scale of the coupling with the link connections and the equalizing bar removed.

My invention has relation to shaft couplings and has been more particularly designed to provide a shaft coupling for engine shafts suitable for use on rolling mills and for other heavy work, but is applicable as a shaft coupling for various purposes.

The object of my invention is to provide a simple and strong coupling capable of transmitting large power and which will take care of want of alinement between the shaft sections. Also to provide a coupling of this character which will shorten the space between the engine and the machine or mill to be driven, and allow the engine to be set closely adjacent to the mill or machine; also to provide a coupling of this character which is so constructed that when certain of the parts are removed, the remaining parts attached to the driving side of the coupling can rotate without interference with the parts attached to the driven side of the coupling.

The nature of my invention will be best understood by reference to the drawings, in which I have shown the preferred embodiment thereof, and which will now be described, it being premised, however, that various changes may be made in the details of construction and arrangement of the parts, without departing from the spirit and scope of my invention, as defined in the appended claims.

In these drawings, the numeral 2 designates the engine crank shaft, and 3 the shaft to be coupled to and driven by the engine crank shaft. Rigidly keyed to each of said shafts is a coupling arm 4 or $4^a$, the two arms 4 and $4^a$ being shown as extending at right angles to each other, and with their end portions projecting radially from the shafts.

Pivotally connected, as by a pin 5, with the outer end of each arm of each coupling flange is a link 6. The four links 6 are arranged in two pairs, and the outer ends of adjacent links are pivotally connected, as by pins 7, with the end portions of an equalizing bar 8. This equalizing bar extends diametrically between the separated inner ends of the shafts 2 and 3, and its axis bisects approximately the angle formed by the two coupling arms. The pins 5 preferably each have a driving fit in one of the coupling arms, with caps 9 secured thereto, while the pins 7 are secured by the nuts 10. The ends of the links are preferably forked or bifurcated to embrace the end portions of the equalizing bar.

With couplings of this character, it is frequently desirable to be able to rotate portions of the coupling attached to the engine shaft at times when the coupling is disconnected and the driving shaft is idle. Inasmuch as the pins 5 which connect the links to the coupling members or arms 4 and $4^a$ are permanently secured in said members or arms, if these pins be arranged at points equidistant on radial lines from the longitudinal center of the coupling, they will interfere to such an extent that the arms or member on the engine shaft can not rotate freely. To avoid this difficulty, I place the pins 5 which connect the links with one of these arms at a different radial distance from the longitudinal center of the coupling from the pins which connect the links to the other of said arms. This difference in radial distances is sufficient so that the two sets of pins will rotate in independent concentric circular paths freely and without interference. For this purpose, I have shown the arm 4 as being considerably shorter than the arm $4^a$. By removing the connecting links and equalizer bar, the engine shaft and its attached arm can rotate freely without engaging the arm on the driven shaft. This is of importance in many instances, as in making repairs to the engine shaft, bearings, etc., and where it is desired to start up the engine and run it for testing purposes before it is coupled to the driven shaft.

The advantages of my invention will be readily apparent since it provides a simple and efficient coupling capable of transmitting large power and which is made sufficiently flexible by the arrangement of links and equalizing bar to accommodate itself to changes in the alinement of the two shafts or shaft sections which are coupled thereto.

I claim:

1. In a shaft coupling, the combination of two shaft members to be coupled, a transverse coupling member rigidly secured to each shaft member, projecting pins carried by the coupling members and lying in the same transverse plane, the pins of one coupling member being located farther from the coupling center than the pins of the other coupling member by a distance sufficient to allow one set of pins passing the other set, when one shaft member is rotated relatively to the other shaft member, a link detachably engaging each pin and arranged in pairs, and an equalizing member connecting the pairs of links between the ends of the shaft members, substantially as described.

2. In a shaft coupling, the combination of two shaft members to be coupled, a transverse coupling member rigidly secured to each shaft member, projecting pins carried by the coupling members and lying in the same transverse plane, the pins of one coupling member being located farther from the coupling center than the pins of the other coupling member by a distance sufficient to allow one set of pins passing the other set, when one shaft member is rotated relatively to the other shaft member, links connected to the sets of pins, and an equalizing connection between the links, substantially as described.

In testimony whereof, I have hereunto set my hand.

JULIAN KENNEDY.

Witnesses:
ALICE M. GODFREY,
H. W. RANO.